United States Patent
Rhyoo et al.

(10) Patent No.: US 11,103,793 B2
(45) Date of Patent: Aug. 31, 2021

(54) METHOD AND APPARATUS FOR PROVIDING USER COLLABORATIVE CONTENT

(71) Applicant: Netmarble Corporation, Seoul (KR)

(72) Inventors: Jeong Yeon Rhyoo, Seoul (KR); Kyu Young Park, Seoul (KR); Jung Eun Lee, Seoul (KR)

(73) Assignee: Netmarble Corporation

( * ) Notice: Subject to any disclaimer, the term of this patent is extended or adjusted under 35 U.S.C. 154(b) by 0 days.

(21) Appl. No.: 16/829,945

(22) Filed: Mar. 25, 2020

(65) Prior Publication Data
US 2020/0324210 A1    Oct. 15, 2020

(30) Foreign Application Priority Data
Apr. 11, 2019 (KR) .................. 10-2019-0042488

(51) Int. Cl.
*A63F 13/798* (2014.01)
*A63F 13/35* (2014.01)
*H04L 29/06* (2006.01)

(52) U.S. Cl.
CPC ............ *A63F 13/798* (2014.09); *A63F 13/35* (2014.09); *H04L 65/4015* (2013.01)

(58) Field of Classification Search
None
See application file for complete search history.

(56) References Cited

U.S. PATENT DOCUMENTS

| | | | | |
|---|---|---|---|---|
| 2007/0093294 A1* | 4/2007 | Serafat | .................. | A63F 13/327 463/39 |
| 2008/0039212 A1* | 2/2008 | Ahlgren | .................. | H04W 4/21 463/46 |
| 2011/0112895 A1* | 5/2011 | Snyder | ............... | G06Q 30/0609 705/14.12 |
| 2011/0244964 A1* | 10/2011 | Glynne-Jones | ......... | A63F 13/47 463/40 |
| 2018/0339213 A1* | 11/2018 | Baughman | ............. | G06N 5/003 |

(Continued)

FOREIGN PATENT DOCUMENTS

| JP | 2002-320780 | 11/2002 |
|---|---|---|
| JP | 2013013479 A | 1/2013 |
| KR | 10-2013-0089740 | 8/2013 |

OTHER PUBLICATIONS

"Review on PS4 3on3 Free-style", https://blog.naver.com/bouncer85/220976008404, dated May 13, 2019, 15 pages.

(Continued)

*Primary Examiner* — Ronald Laneau
(74) *Attorney, Agent, or Firm* — Lewis Roca Rothgerber Christie LLP

(57) ABSTRACT

A content providing method includes providing a same content to a plurality of users each being included in one of a first team and a second team, determining whether a condition for a strategic timeout is satisfied during a progress of the content, providing the strategic timeout to the users by suspending the content when the condition is satisfied, providing at least one function for the strategic timeout to each of users in the first team and users in the second team, and resuming the content when the strategic timeout ends.

19 Claims, 10 Drawing Sheets

(56) References Cited

U.S. PATENT DOCUMENTS

2018/0339214 A1* 11/2018 Baughman ......... A63B 71/0605

OTHER PUBLICATIONS

"'1:1 management Baseball' Freestyle manager", http://www.thisisgame.com/webzine/game/nboard/16/?n=11210, dated May 13, 2019, 9 pages.
"[Information] Talk with mouse and keyboard only! Shortcut summary useful for beginners", http://www.inven.co.kr/webzine/news/?news=89071, May 13, 2019, 10 pages.

* cited by examiner

METHOD AND APPARATUS FOR PROVIDING USER COLLABORATIVE CONTENT

CROSS-REFERENCE TO RELATED APPLICATION(S)

This application claims the priority benefit of Korean Patent Application No. 10-2019-0042488 filed on Apr. 11, 2019, in the Korean Intellectual Property Office, the disclosure of which is incorporated herein by reference for all purposes.

BACKGROUND

1. Field

One or more example embodiments relate to technology for providing a user collaborative content to a plurality of users divided into at least two teams.

2. Description of Related Art

In an online game, a user may be provided with a content that proceeds in collaboration with other users in addition to a personal content. The content may be referred to as a user collaborative content. For example, a plurality of users may be divided into two teams, and a content in which the teams compete against each other may be provided as a user collaborative content. In general, a user may need to rapidly respond to a situation that changes constantly in such a user collaborative content.

SUMMARY

According to an example embodiment, there is provided a content providing method to be performed by a server, the content providing method including providing a same content to a plurality of users each being included in one of a first team and a second team, determining whether a condition for a strategic timeout is satisfied during a progress of the content, providing the strategic timeout to the users by suspending the content when the condition is satisfied, providing at least one function for the strategic timeout to each of users in the first team and users in the second team, and resuming the content when the strategic timeout ends.

The content providing method may further include determining a lead user among the users in the first team before the content proceeds. The at least one function may be used by the lead user.

The determining of the lead user may include at least one of determining a user with a highest ranking among the users in the first team to be the lead user, determining a user with a highest winning rate among the users in the first team to be the lead user, determining a user among the users in the first team to be the lead user, or determining the lead user based on a vote for each of the users in the first team.

The determining of whether the condition for the strategic timeout is satisfied during the progress of the content may include outputting a button for the strategic timeout to the lead user when a preset situation is satisfied during the progress of the content, and determining that the condition is satisfied when a request for the strategic timeout is received from the lead user through the button.

The preset situation may include a situation in which a request for the strategic timeout is received from a preset proportion or greater of the users in the first team.

The preset situation may include a situation in which a sum of remaining physical strengths of user characters of the users in the first team is less than a preset value.

The preset situation may include a situation in which an accumulated value of scores obtained by user characters of the users in the first team is greater than or equal to a preset value.

The preset situation may include a situation in which a degree of the progress of the content reaches a preset degree.

The providing of the strategic timeout to the users may include storing a state of the progress of the content. The resuming of the content may include resuming the content by loading the stored state of the progress of the content.

The providing of the at least one function for the strategic timeout to each of the users in the first team and the users in the second team may include providing at least one of a text chat function or a voice chat function.

At least one of the text chat function or the voice chat function may be provided only to the lead user.

The providing of the at least one function for the strategic timeout to each of the users in the first team and the users in the second team may further include providing a function of combining preset words to users excluding the lead user among the users.

The providing of the at least one function for the strategic timeout to each of the users in the first team and the users in the second team may include determining a target event among one or more events occurring during the progress of the content, and providing a review image of the target event to the users in the first team.

The providing of the at least one function for the strategic timeout to each of the users in the first team and the users in the second team may include providing a user character maintenance function.

The providing of the at least one function for the strategic timeout to each of the users in the first team and the users in the second team may include displaying a target user character selected by a teaching user among the users in the first team, and displaying the target user character controlled based on an input from the teaching user.

The displaying of the controlled target user character may include displaying the target user character along with the input.

When the condition for the strategic timeout is satisfied, the content providing method may further include determining whether a rejection condition for not providing the strategic timeout is satisfied. When the rejection condition is not satisfied, the providing of the strategic timeout to the users may include providing the strategic timeout to the users.

The determining of whether the condition for the strategic timeout is satisfied during the progress of the content may include determining that the condition for the strategic timeout is satisfied when a request for the strategic timeout is received from the lead user of the first team. The determining of whether the rejection condition for not providing the strategic timeout is satisfied may include outputting, to a lead user of the second team, a notification that the request for the strategic timeout is received from the first team, receiving a rejection of the strategic timeout from the lead user of the second team, and determining that the rejection condition is satisfied when the rejection of the strategic timeout is received.

According to another example embodiment, there is provided a server configured to provide a content to a plurality of users, the server including a memory in which a program of providing the content is recorded, and a processor configured to execute the program. The program may include providing a same content to a plurality of users each being included in one of a first team and a second team, determining whether a condition for a strategic timeout is satisfied during a progress of the content, providing the strategic timeout to the users by suspending the content when the condition is satisfied, providing at least one function for the strategic timeout to each of users in the first team and users in the second team, and resuming the content when the strategic timeout ends.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
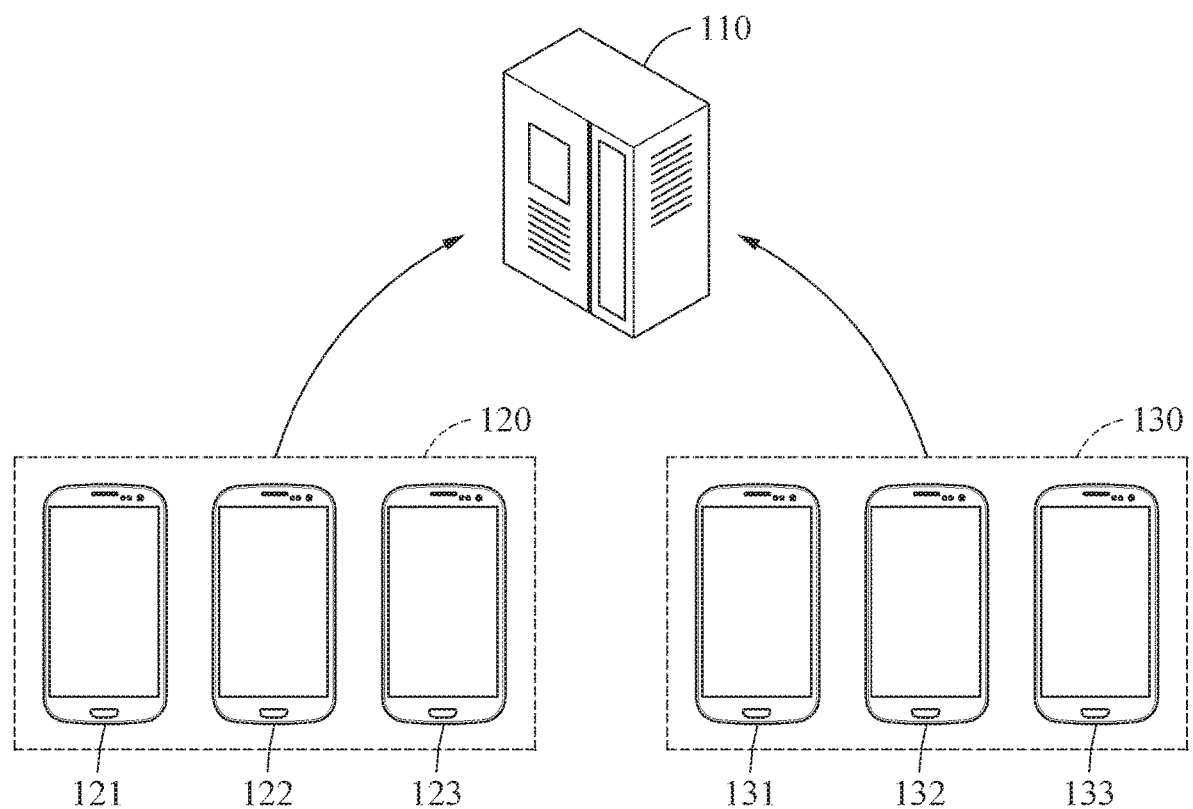
FIG. 1 is a diagram illustrating an example of a content providing system according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component. Throughout the disclosure, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating an example of a content providing system according to an example embodiment.

According to an example embodiment, a content providing system 100 includes a content providing server 110 (hereinafter simply the server 110), and a plurality of user terminals 121, 122, 123, 131, 132, and 133. A user may use a content through a user account registered in the server 110. A description of "user" to be provided hereinafter may also be about a user account or a user terminal.

According to an example embodiment, the server 110 may provide an online game to the user terminals 121, 122, 123, 131, 132, and 133. The server 110 may provide a plurality of contents to the user terminals 121, 122, 123, 131, 132, and 133 through the online game. For example, a content may be a task assigned to a user to complete a certain quest. For example, when respective users of the user terminals 121, 122, 123, 131, 132, and 133 are divided into a first team 120 and a second team 130 as illustrated, a content such as a siege warfare in which the first team 120 and the second team 130 compete against each other may be provided. However, the content is not limited to the foregoing example, and may be generated to have various purposes or goals.

A content having a common purpose or goal of a plurality of users may be referred to as a user collaborative content. For example, for users in the first team 120 and users in the second team 130 to complete the user collaborative content, a close collaboration among the users may be required. For example, when the first team 120 is a defense team, a close collaboration among the users in the first team 120 may be required to defend against an attack from the second team 130. In this example, a close collaboration among the users in the second team 130 may also be required.

During a progress of the content, various unexpected situations may occur. To respond to such situations, a strategic timeout may be provided to the users. The users may seek or work out a way to solve a problem or challenge they face through the strategic timeout. Although the strategic timeout is simultaneously provided to the first team 120 and the second team 130, the first team 120 and the second team 130 may not be allowed to interact with each other during the strategic timeout.

That is, the strategic timeout, which is generally given in an offline sports game, may also be applied to an online game. Hereinafter, a content providing method will be described in relation to a strategic timeout with reference to FIGS. 2 through 15.

Figure 2:
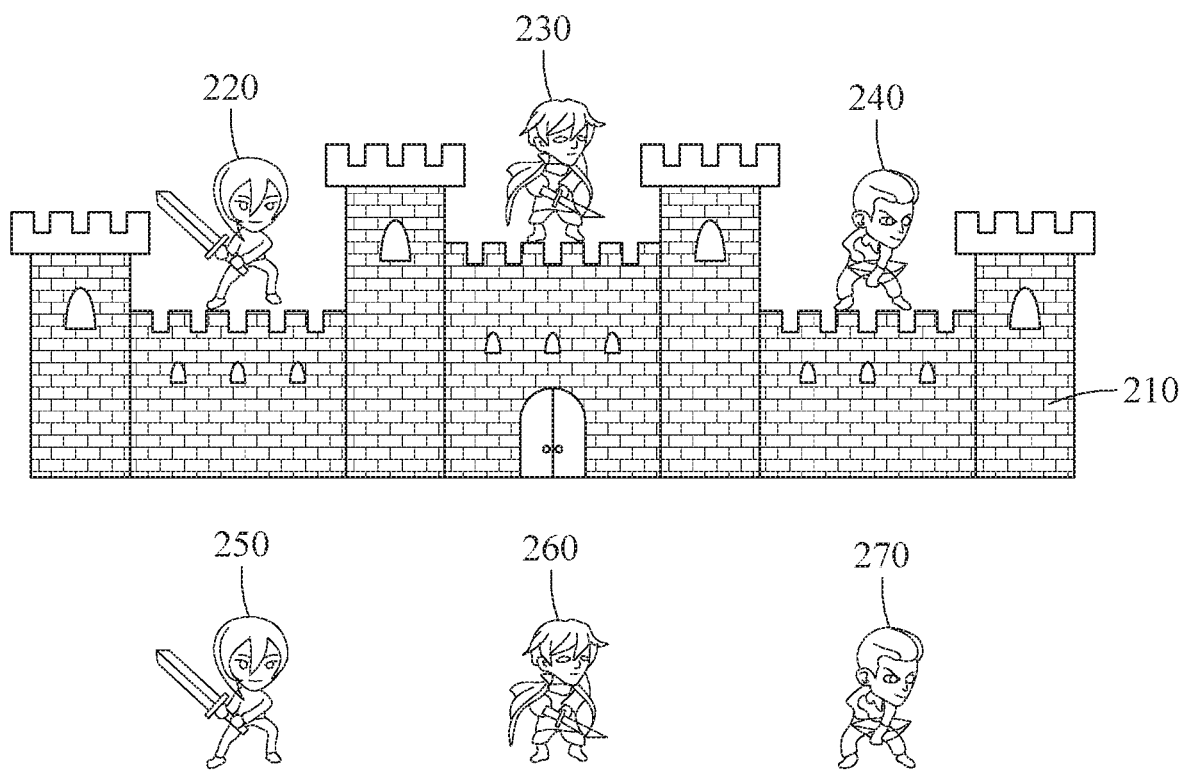
FIG. 2 is a diagram illustrating an example of a user collaborative content according to an example embodiment.

FIG. 2 is a diagram illustrating an example of a user collaborative content according to an example embodiment.

According to an example embodiment, a user collaborative content may be a content in which two teams—a first team and a second team (e.g., the first team 120 and the second team 130 illustrated in FIG. 1)—compete against each other. For example, the first team includes a plurality of users 220, 230, and 240, and may set a goal of defending an attack from the second team. In this example, the second team includes a plurality of users 250, 260, and 270, and may set a goal of capturing a castle 210 occupied by the first team.

The second team may perform various strategies to attack the castle 210, and an attack strategy to be performed by the second team may change depending on a defense strategy performed by the first team. A situation may change in real time based on a degree of a progress of the content, and thus the defense strategy of the first team and the attack strategy of the second team may change according to such a changing situation. To review a strategy, a strategic timeout may be provided to a plurality of users. Here, a strategy of each team should not be exposed to another team, and thus the strategic timeout may be provided to the first team and the second team, separately. The term "strategic timeout" used herein may refer to an amount of time provided to a user belonging to a team for reviewing a strategy through a brief suspension of activity.

Figure 3:
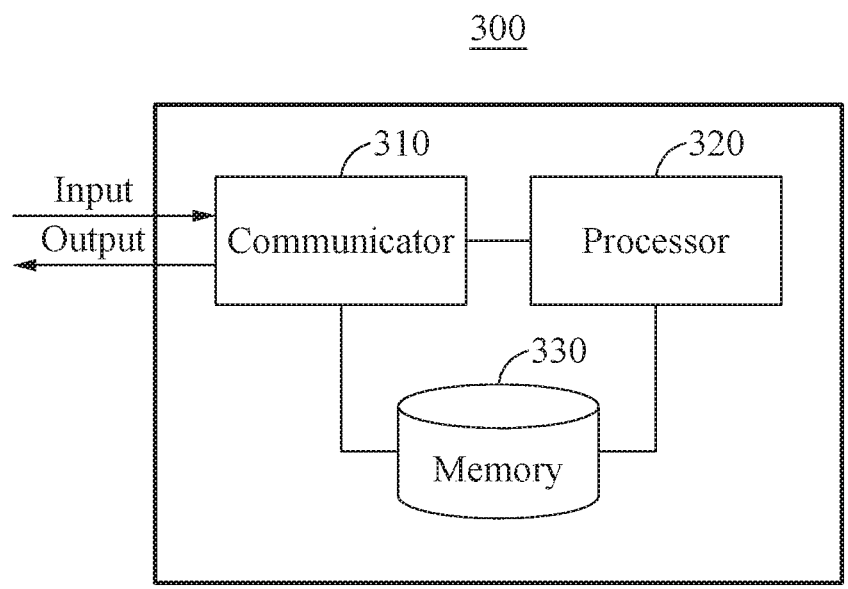
FIG. 3 is a diagram illustrating an example of a content providing server according to an example embodiment.

FIG. 3 is a diagram illustrating an example of a content providing server according to an example embodiment.

Referring to FIG. 3, a content providing server 300 (hereinafter simply the server 300) includes a communicator 310, a processor 320, and a memory 330. The server 300 may correspond to the server 110 described above with reference to FIG. 1.

The communicator 310 may be connected to the processor 320 and the memory 330, and transmit and receive data to and from the processor 320 and the memory 330. The term "transmitting and receiving A" used herein may indicate transmitting and receiving information or data indicating A.

The communicator 310 may be embodied by a circuitry in the server 300. For example, the communicator 310 may include an internal bus and an external bus. For another example, the communicator 310 may be a component connecting the server 300 and an external device. In this example, the communicator 310 may be an interface. The communicator 310 may receive data from the external device and transmit the received data to the processor 320 and the memory 330.

The processor 320 may process data received through the communicator 310 and data stored in the memory 330. The processor 320 may be a data processing device embodied by hardware having a circuit of a physical structure to implement desired operations. The desired operations may include, for example, a code or instructions included in a program. The data processing device embodied by hardware may include, for example, a microprocessor, a central processing unit (CPU), a processor core, a multicore processor, a multiprocessor, an application-specific integrated circuit (ASIC), and a field-programmable gate array (FPGA).

The processor 320 may implement a computer-readable code stored in the memory 330, for example, software, and instructions induced by the processor 320.

The memory 330 may store the data received through the communicator 310 and data processed by the processor 320. For example, the memory 330 may store the program, for example, an application and software. The program to be stored may be a set of syntaxes coded and implementable by the processor 320 to provide a content.

The memory 330 may include, for example, at least one volatile memory, nonvolatile memory, random-access memory (RAM), flash memory, hard disk drive, and optical disc drive.

The memory 330 may store a set of instructions, for example, software, that operates the server 300. The set of the instructions that operates the server 300 may be implemented by the processor 320.

Hereinafter, how the communicator 310, the processor 320, and the memory 330 operate will be described in greater detail with reference to FIGS. 4 through 15.

Figure 4:
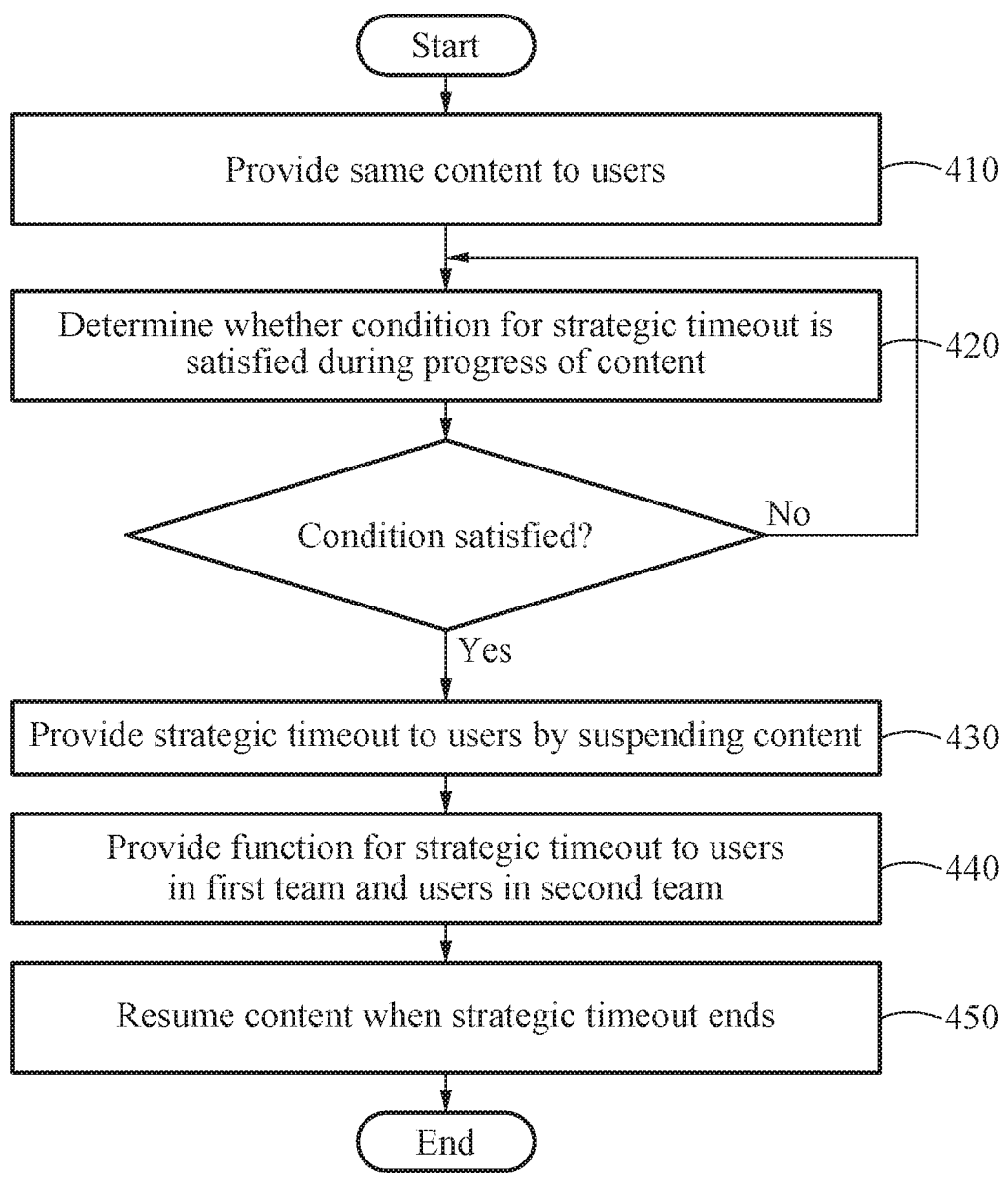
FIG. 4 is a flowchart illustrating an example of a content providing method according to an example embodiment.

FIG. 4 is a flowchart illustrating an example of a content providing method according to an example embodiment.

Operations 410 through 450 to be described hereinafter with reference to FIG. 4 may be performed by the server 300 described above with reference to FIG. 3.

Referring to FIG. 4, in operation 410, the server 300 provides a same content, for example, a siege warfare, to a plurality of users. For example, the server 300 may generate a virtual space to which the users connect simultaneously, and provide the content to the users connecting to the virtual space. The users may be divided into a first team and a second team in the virtual space.

According to an example embodiment, the users connecting to the virtual space may prepare themselves for the content before the content starts or proceeds. For example, a user may adjust an ability of a user character of the user, or change an equipped item. For another example, users in the first team may determine a strategy for completing the content using a text chat function and a voice chat function.

When the users are all prepared for the content or a preset time arrives, the content may start or proceed.

In operation 420, the server 300 determines whether a condition for a strategic timeout is satisfied during a progress of the content. For example, when the progress of the content reaches a certain degree of the progress of the content, or when a request for the strategic timeout is received from a leader of each team, the condition for the strategic timeout may be determined to be satisfied. However, the condition for the strategic timeout is not limited to the foregoing example. The condition for the strategic timeout will be described in greater detail with reference to FIGS. 5 through 7.

In operation 430, when the condition for the strategic timeout is determined to be satisfied, the server 300 provides the strategic timeout to the users by suspending the content. The server 300 may store data at a point in time at which the progress of the content is suspended. That is, a state of the progress of the content at such a point in time may be stored. For example, a remaining physical strength, an operating skill, and a retained item of a user character, and a physical strength of a non-player character (NPC), at the point in time may be stored. When the content is suspended, the strategic timeout, which is a time for the users to respond to a new situation, may be provided to the users.

For fairness, the strategic timeout may be provided simultaneously to the first team and the second team. For example, even when the first team satisfies the condition for the strategic timeout, the strategic timeout may be provided also to the second team.

In operation 440, the server 300 provides at least one function for the strategic timeout to the users. For example, a same function may be provided to the first team and the second team. For another example, different functions may be provided to the first team and the second team. The function to be provided may be selected by a leader of each team, and may vary depending on a characteristic of each team, for example, a defensive characteristic or an offensive characteristic.

The function for the strategic timeout may help users located at remote places effectively plan a strategy. For example, the function for the strategic timeout may include a chat function, a review image providing function, and a character demonstrating function. For another example, a user character maintenance function may be provided. Through such a function, a user may adjust an ability of a user character of the user, or change a retained item.

The function for the strategic timeout will be described in greater detail with reference to FIGS. 8 through 12.

In operation 450, the server 300 resumes the content when the strategic timeout ends. For example, the server 300 may resume the content by loading the stored state of the progress of the content. For another example, the server 300 may resume the content by loading data generated by applying data changed during the strategic timeout to data of the stored state of the progress of the content. In this example, when an ability of a user character of a user is adjusted during the strategic timeout or a retained item of the user character is changed during the strategic timeout, the server 300 may apply the adjusted ability and the changed retained item to the state of the progress stored at the point in time at which the content is suspended.

According to an example embodiment, even after the content resumes, whether the condition for the strategic timeout is satisfied or not may be determined continuously. When the same condition as a previous one or a different condition from the previous one is satisfied, the content may be suspended again. That is, while one content is proceeding, the strategic timeout may be performed a plurality of times.

In addition, when the content is completed, the server 300 may provide a reward to the users based on the number of times at which the strategic timeout is performed and a type of the provided function. For example, different rewards may be provided to users in the first team and users in the second team.

Figure 5:
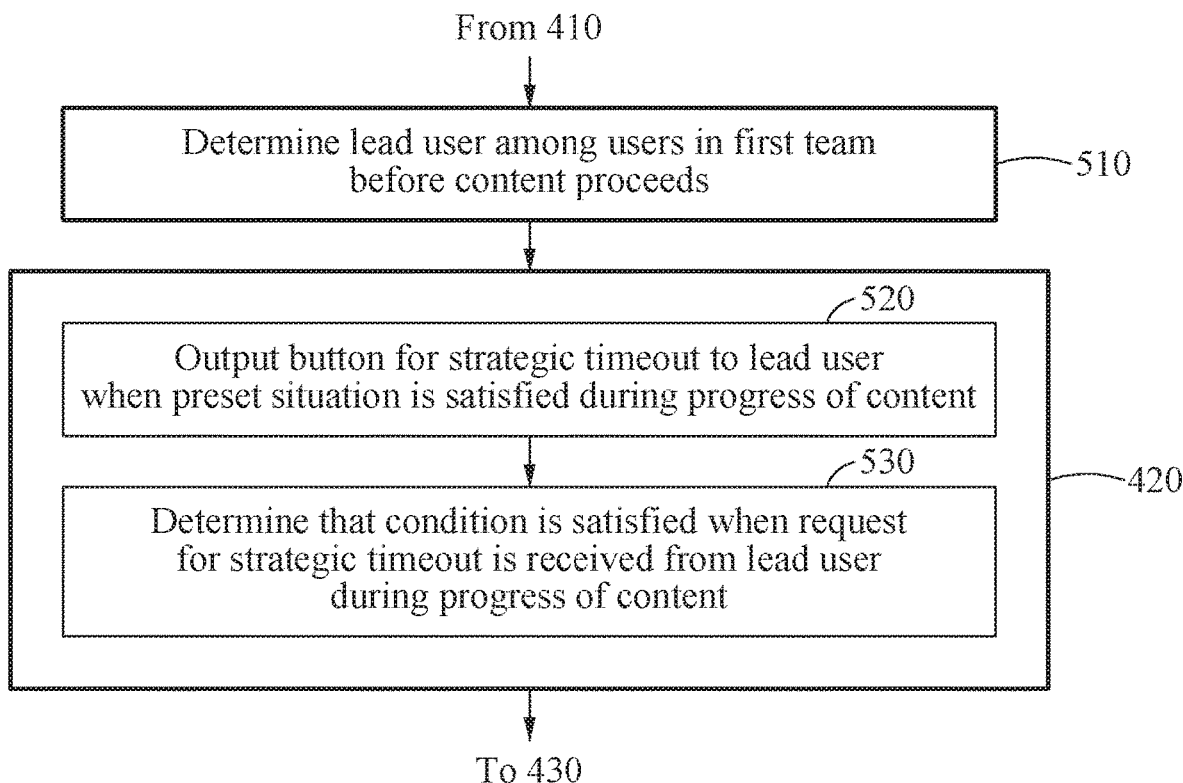
FIG. 5 is a flowchart illustrating an example of determining a lead user and determining whether a condition for a strategic timeout is satisfied based on the lead user according to an example embodiment.

FIG. 5 is a flowchart illustrating an example of determining a lead user and determining whether a condition for a strategic timeout is satisfied based on the lead user according to an example embodiment.

According to an example embodiment, operation 510 to be described hereinafter with reference to FIG. 5 may be performed before the operation 420 described above with reference to FIG. 4 is performed.

Referring to FIG. 5, in operation 510, the server 300 determines a lead user among the users in the first team or a lead user among the users in the second team before the content starts or proceeds. The lead user may be a representative user of the first team or the second team. For example, the lead user may request a strategic timeout. A function for the strategic timeout may be used by the lead user. How the lead user is determined will be described in greater detail with reference to FIG. 6.

When the lead user is determined, operation 420 described above with reference to FIG. 4 may include operations 520 and 530 to be described hereinafter with reference to FIG. 5.

In operation 520, when a preset situation is satisfied during a progress of the content, the server 300 outputs or displays a button for the strategic timeout to the lead user. For another example, when the preset situation is satisfied, an already output button may be activated.

For example, when the first team is a defense team and a preset base of the castle 210 is collapsed or captured, the button may be output to the lead user of the first team.

In operation 530, when a request for the strategic timeout is received from the lead user through the button during the progress of the content, the server 300 determines that the condition for the strategic timeout is satisfied.

Figure 6:
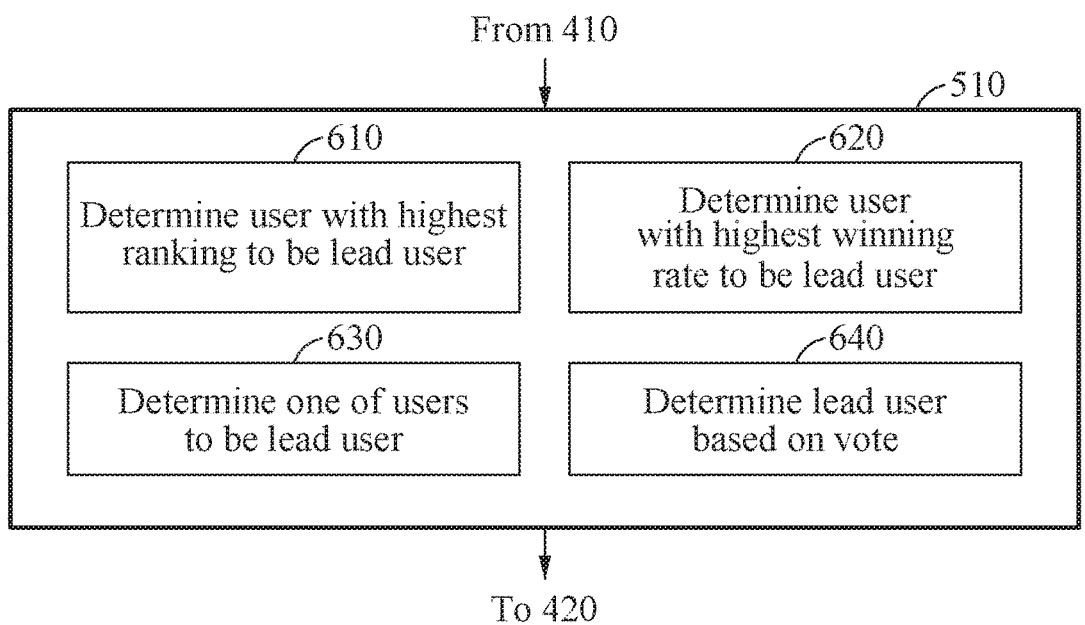
FIG. 6 is a diagram illustrating examples of determining a lead user according to an example embodiment.

FIG. 6 is a diagram illustrating examples of determining a lead user according to an example embodiment.

Operation 510 described above with reference to FIG. 5 may include one of operations 610 through 640 to be described hereinafter with reference to FIG. 6. Although the examples to be described hereinafter are about how a leader of the first team is determined, the examples may also be applied to determine a leader of the second team.

Referring to FIG. 6, in operation 610, the server 300 determines, to be the lead user of the first team, a user with a highest ranking among the users in the first team.

In operation 620, the server 300 determines, to be the lead user of the first team, a user with a highest winning rate among the users in the first team.

In operation 630, the server 300 determines one of the users in the first team to be the lead user of the first team.

Alternatively, in operation 640, the server 300 determines the lead user of the first team based on a vote for each of the users in the first team.

Figure 7:
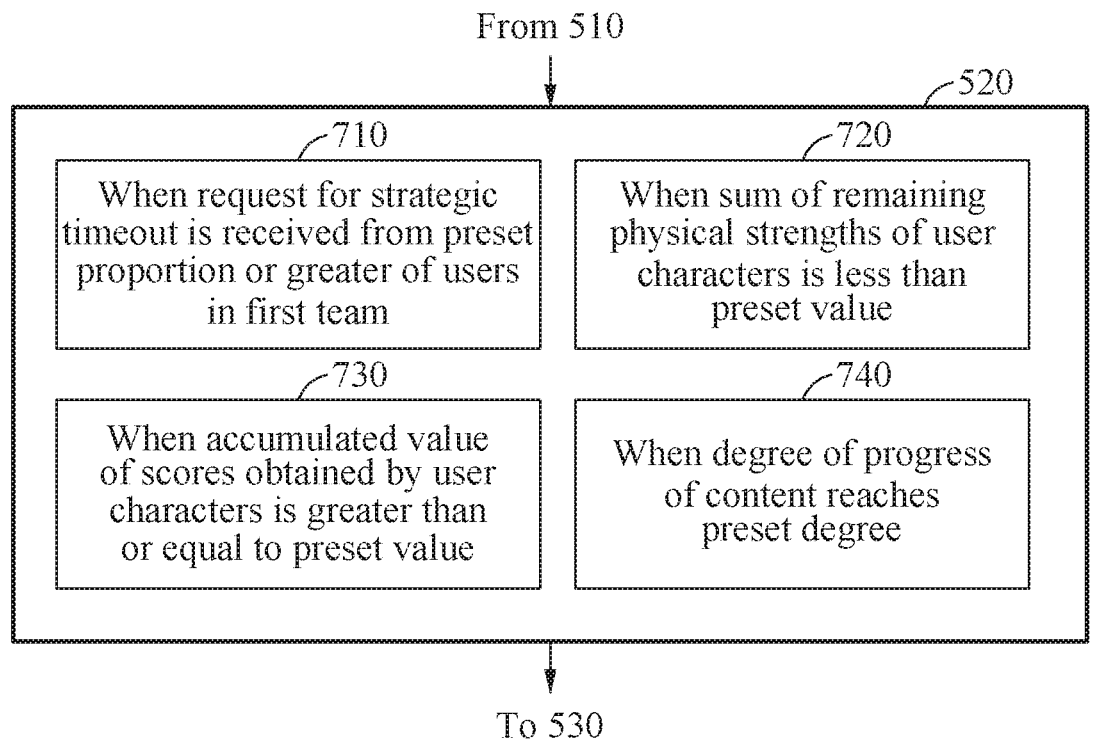
FIG. 7 is a diagram illustrating examples of a preset situation according to an example embodiment.

FIG. 7 is a diagram illustrating examples of a preset situation according to an example embodiment.

According to an example embodiment, operation 520 described above with reference to FIG. 5 may include operations 710 through 740 to be described hereinafter with reference to FIG. 7. Although the examples to be described hereinafter are about a situation set in advance for the first team, the examples may also be applied to the second team in a similar way.

Referring to FIG. 7, in operation 710, when a request for the strategic timeout is received from a preset proportion or greater of the users in the first team, the server 300 determines that the preset situation is satisfied.

In operation 720, when a sum of remaining physical strengths of user characters of the first team is less than a preset value, the server 300 determines that the preset situation is satisfied.

In operation 730, when an accumulated value of scores obtained by the user characters of the first team is greater than or equal to a preset value, the server 300 determines that the preset situation is satisfied. For example, a user character may obtain a score during the progress of the content.

In operation 740, when a degree of the progress of the content reaches a degree preset for the first team, the server 300 determines that the preset situation is satisfied.

Figure 8:
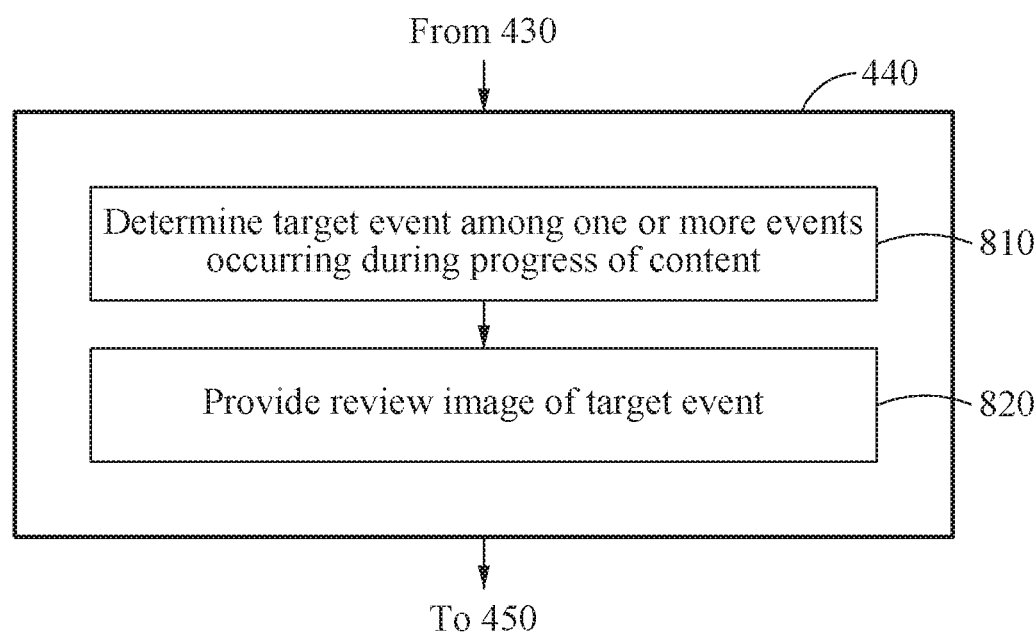
FIG. 8 is a flowchart illustrating an example of providing a review image providing function during a strategic timeout according to an example embodiment.

FIG. 8 is a flowchart illustrating an example of providing a review image providing function during a strategic timeout according to an example embodiment.

According to an example embodiment, operation 440 described above with reference to FIG. 4 may include operations 810 and 820 to be described hereinafter with reference to FIG. 8. Although the example to be described hereinafter is about the first team, the example may also be applied to the second team in a similar way.

Referring to FIG. 8, in operation 810, the server 300 determines a target event among one or more events occurring during the progress of the content. The target event may be the most impressive event among the events. For example, the events may include an event in which one of a plurality of user characters is killed or dies. For another example, the events may include an event in which one of bases or fortresses of the castle 210 is collapsed or captured.

In operation 820, the server 300 provides a review image of the target event to the users in the first team. Through the review image, the users in the first team may review how the target event occurred. The review image may be provided with being converted to be at various viewpoints. For example, user images output during the occurrence of the target event may be provided as the review image. For another example, the server 300 may generate a review image of a new viewpoint based on data generated during the occurrence of the target event, and provide the generated review image to the users in the first team.

Through the review image, the users may review a strategy to be performed after the content resumes.

Figure 9:
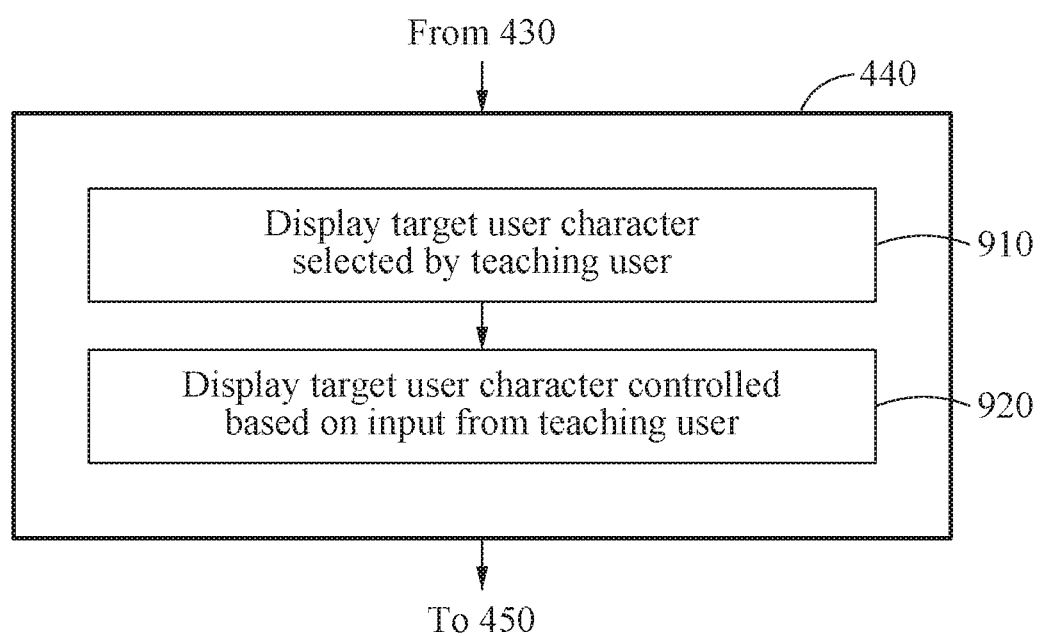
FIG. 9 is a flowchart illustrating an example of providing a user character control demonstrating function during a strategic timeout according to an example embodiment.

FIG. 9 is a flowchart illustrating an example of providing a user character control demonstrating function during a strategic timeout according to an example embodiment.

According to another example embodiment, operation 440 described above with reference to FIG. 4 may include operations 910 and 920 to be described hereinafter with reference to FIG. 9.

Referring to FIG. 9, in operation 910, the server 300 displays a target user character selected by a teaching user.

The teaching user may refer to a teacher who is selected from among the users in the first team. For example, the lead user may become the teaching user. For another example, a user who controls a user character most desirably among the users in the first team may become the teaching user.

In operation 920, the server 300 displays the target user character controlled based on an input from the teaching user. In addition, the server 300 may display the target user character along with the input from the teaching user. The teaching user may demonstrate how to control the target user character to a user who may not control the target user character desirably. Through such a demonstration provided by the teaching user, the user may learn how to control the target user character desirably.

To prevent the progress of the content from being prolonged extremely, a time limit for using such a demonstration function may be set in advance. Thus, the teaching user may control the target user character within the time limit.

As a user learns a character controlling method required for a new strategy, the user may more effectively perform the strategy when the content resumes.

Hereinafter, such a user character control demonstrating function described above will be described in greater detail with reference to FIG. 10.

Figure 10:
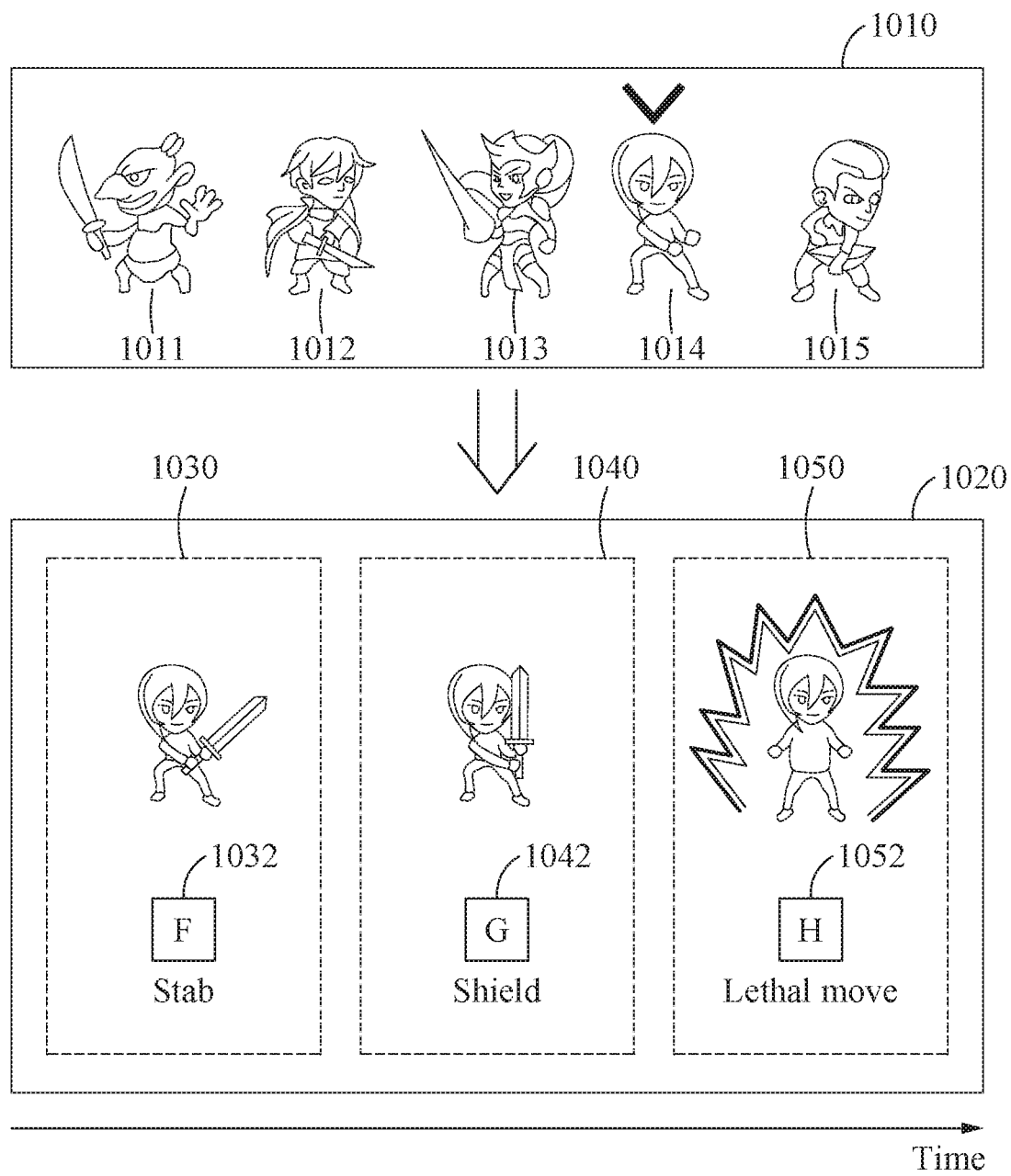
FIG. 10 is a diagram illustrating an example of a user character control demonstrating function according to an example embodiment.

FIG. 10 is a diagram illustrating an example of a user character control demonstrating function according to an example embodiment.

Referring to FIG. 10, in operation 1010, a plurality of user characters 1011 through 1015 are displayed. A teaching user may select the user character 1014 as a target user character to be controlled from among the user characters 1011 through 1015.

For example, the user characters 1011 through 1015 to be displayed may be characters possessed by the teaching user. That is, a user character that is not possessed by the teaching user may not be displayed.

For another example, the user characters 1011 through 1015 to be displayed may be user characters that are currently participating in a same content. In this example, user characters of a same team and user characters of a counterpart team may be displayed together.

In operation 1020, the target user character 1014 is controlled based on an input from the teaching user. Here, movements 1030, 1040, and 1050 of the target user character 1014 may be displayed based on an input from the teaching user. In addition, corresponding inputs 1032, 1042, and 1052 from the teaching user may be displayed in addition to the movements 1030, 1040, and 1050 of the target user character 1014. For example, the movement 1050 in response to the input 1052 may be displayed along with the input 1052, and thus another user may learn how to control the target user character 1014.

Figure 11:
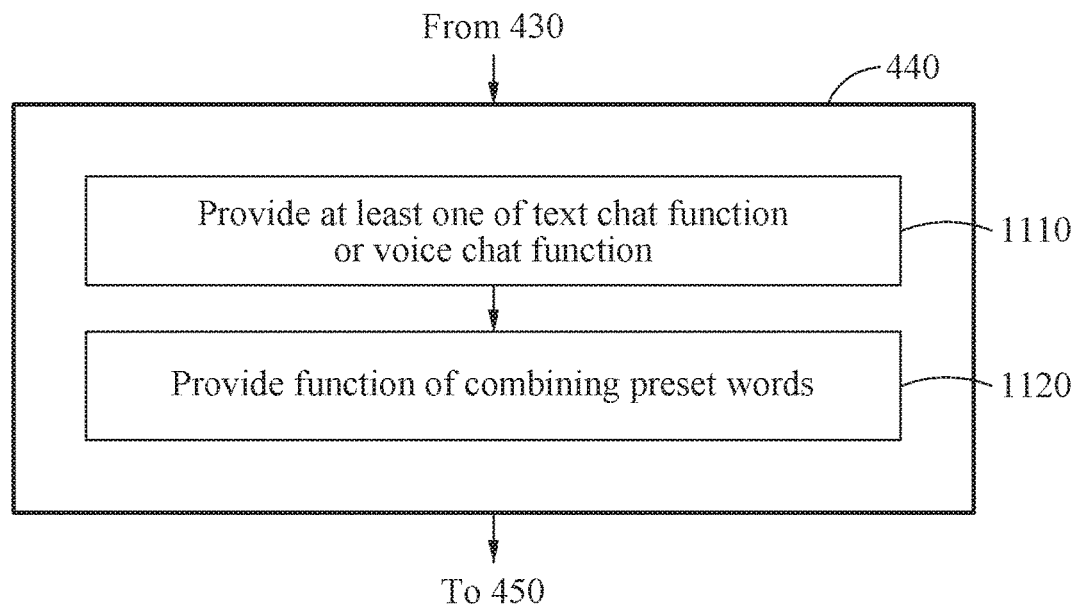
FIG. 11 is a flowchart illustrating an example of providing a chat function during a strategic timeout according to an example embodiment.

FIG. 11 is a flowchart illustrating an example of providing a chat function during a strategic timeout according to an example embodiment.

According to still another example embodiment, operation 440 described above with reference to FIG. 4 may include operations 1110 and 1120 to be described hereinafter with reference to FIG. 11.

Referring to FIG. 11, in operation 1110, the server 330 provides at least one of a text chat function or a voice chat function. For example, at least one of the text chat function or the voice chat function may be provided only to the lead user of the first team for short communication.

In operation 1120, the server 300 provides a function of combining preset words to other users in the first team excluding the leader user of the first team. The function of combining the preset words may be a quick message function. The quick message function will be described in greater detail with reference to FIG. 12.

Figure 12:
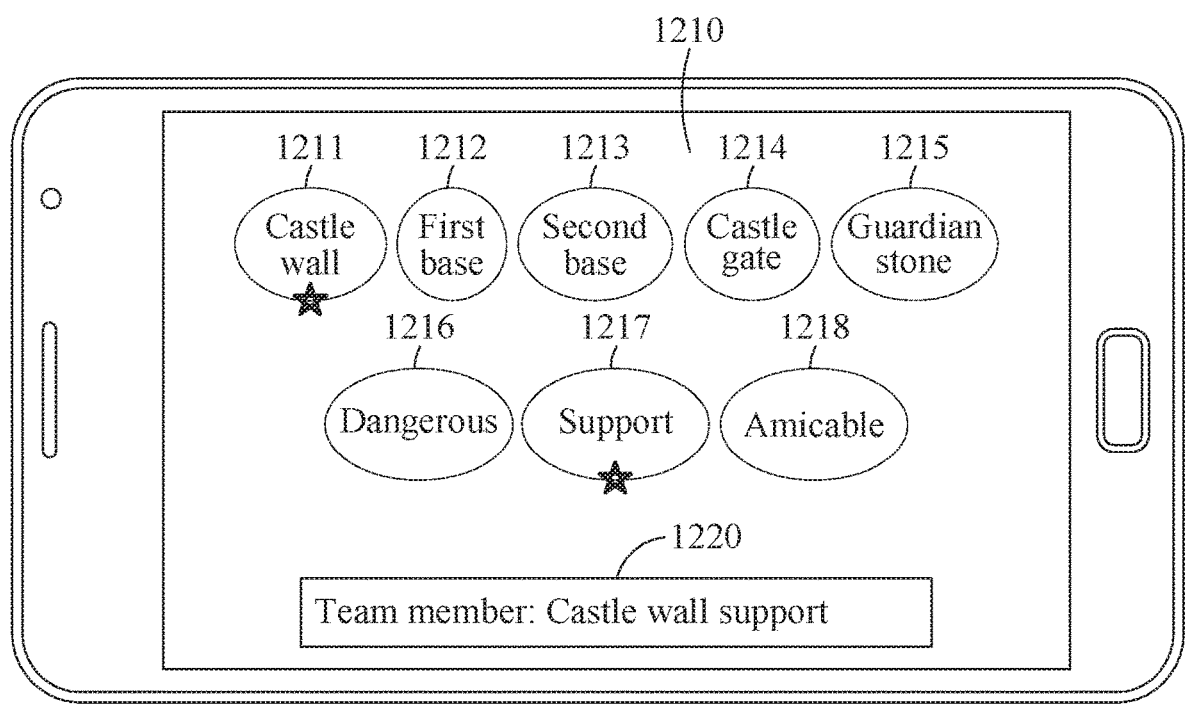
FIG. 12 is a diagram illustrating an example of a word combining function of a chat function according to an example embodiment.

FIG. 12 is a diagram illustrating an example of a word combining function of a chat function according to an example embodiment.

A quick message function may display a plurality of preset words 1211 through 1218 on a display 1210. A user may combine a portion of the displayed words 1211 through 1218 to generate a meaning of a message the user desires to convey. For example, the user may touch a word "castle wall" 1211 and a word "support" 1217 to generate a meaning of a message "castle wall support" 1220. Through the quick message function, the user may effectively and rapidly convey such a meaning to another user.

Figure 13:
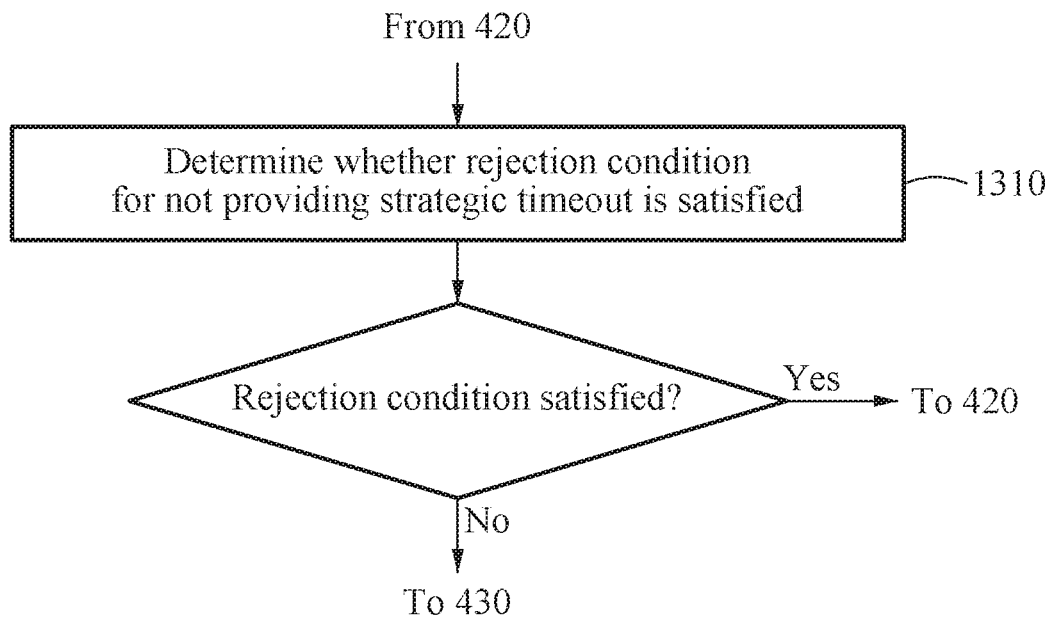
FIG. 13 is a flowchart illustrating an example of determining whether a rejection condition for not providing a strategic timeout is satisfied according to an example embodiment.

FIG. 13 is a flowchart illustrating an example of determining whether a rejection condition for not providing a strategic timeout is satisfied according to an example embodiment.

After operation 420 described above with reference to FIG. 4 is performed, operation 1310 to be described hereinafter with reference to FIG. 13 may be further performed.

Figure 14:
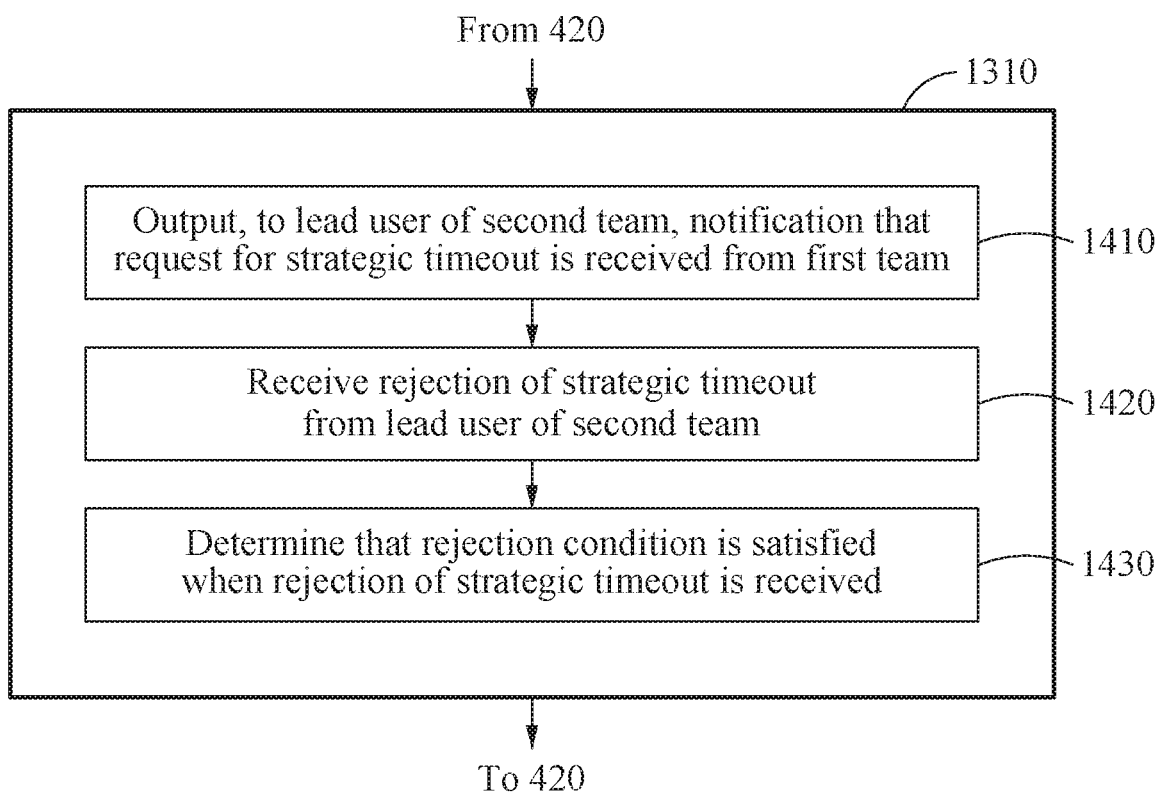
FIG. 14 is a flowchart illustrating an example of determining that a rejection condition is satisfied when a rejection of a strategic timeout is received from a user of another team according to an example embodiment.

Referring to FIG. 14, in operation 1310, the server 300 determines whether a rejection condition for not providing the strategic timeout is satisfied.

For example, even when the condition for the strategic timeout is satisfied, the strategic timeout may not be provided when the strategic timeout is insignificant or useless. That is, that the rejection condition is satisfied may indicate that the strategic timeout is insignificant or useless. The server 300 may determine whether there is no probability or an extremely low probability of a quest being fulfilled or completed based on a current situation, and determine that the rejection condition is satisfied in such a situation.

For another example, when the first team requests the strategic timeout, but the second team rejects such a request for the strategic timeout, the strategic timeout may not be provided.

When the rejection condition is not satisfied, operation 430 describe above with reference to FIG. 4 may be performed. That is, when the rejection condition is not satisfied, the strategic timeout may be provided to a plurality of users.

FIG. 14 is a flowchart illustrating an example of determining that a rejection condition is satisfied when a rejection of a strategic timeout is received from a user of another team according to an example embodiment.

Operation 1310 described above with reference to FIG. 13 may include operations 1410 through 1430 to be described hereinafter with reference to FIG. 14.

Referring to FIG. 14, in operation 1410, when a request for the strategic timeout is received from the lead user of the first team, the server 300 outputs, to a lead user of the second team, a notification that the request for the strategic timeout is received.

For example, a button for rejection may be output, or activated, to the lead user of the second team along with the notification. According to examples, the output of the button for the rejection may be activated for a preset time, and then inactivated after the time elapses. Thus, when the lead user of the second team does not push the button for an explicit expression of the rejection, it may be considered that the lead user of the second team does not reject the strategic timeout.

In operation 1420, the server 300 receives the rejection of the strategic timeout from the lead user of the second team.

In operation 1430, when the rejection of the strategic timeout is received, the server 300 determines that the rejection condition is satisfied.

Figure 15:
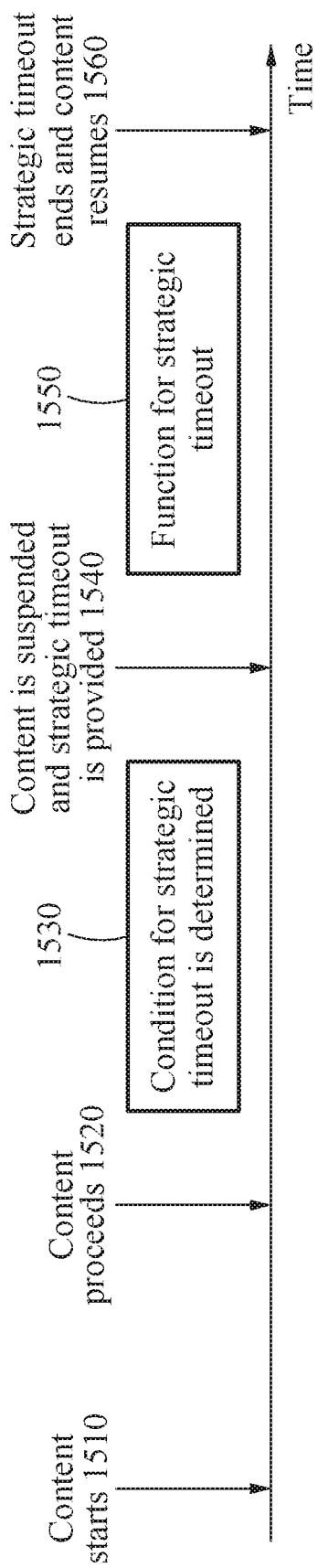
FIG. 15 is a diagram illustrating an example of a timeline by which a content is provided according to an example embodiment.

FIG. 15 is a diagram illustrating an example of a timeline by which a content is provided according to an example embodiment.

Referring to FIG. 15, a content starts being provided at a point 1510 in time. For example, when a plurality of users connects to a virtual space for the content to be provided, the content starts being provided.

The content then proceeds when the users are all prepared at a point 1520 in time. After the content proceeds, whether a condition for a strategic timeout is satisfied or not is determined at a point 1530 in time.

From the point 1530 at which the condition for the strategic timeout is satisfied, the content is suspended and the strategic timeout is provided. A function 1550 for the strategic timeout is provided during the strategic timeout. Through the function 1550 for the strategic timeout, the users may effectively establish a new strategy.

The strategic timeout ends at a point 1560 in time, from which the content resumes.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A content providing method executed by one or more servers for transmitting collaborative digital content to a plurality of users divided into at least two teams, over a communication network, the method comprising:
    generating a virtual space to which the plurality of users wirelessly connect simultaneously;
    transmitting a digital content to a plurality of user terminals used by a respective user of the plurality of users, over the communication network, wherein each of the users of a receptive user terminal is included in one of a first team data structure and a second team data structure stored in a computer memory;
    monitoring a progress of the digital content being utilized and changed by each of the plurality of user terminals;
    storing in the computer memory a progress of the digital content utilized by each of the plurality of user terminals;
    determining whether a condition for a strategic timeout, from a plurality of stored conditions, is satisfied during a progress of the content;
    when the condition is satisfied, transmitting over the communication network, the strategic timeout to the user terminals for suspending the progress of the digital content by the user terminals;
    storing a state of the progress of the digital content in the computer memory, when the progress of the digital content is suspended;
    transmitting over the communication network, at least one function for the strategic timeout to each of users in the first team and each of the users in the second team; and
    resuming the progress of the digital content when the strategic timeout ends, by loading the stored state of the progress of the digital content.

2. The content providing method of claim 1, further comprising: determining a lead user among the plurality of users in the first team before the progress of the digital content is resumed, wherein the at least one function is used by the lead user.

3. The content providing method of claim 2, wherein the determining of the lead user comprises at least one of: determining, to be the lead user, a user with a highest ranking among the users in the first team; determining, to be the lead user, a user with a highest winning rate among the users in the first team; determining, to be the lead user, a user among the users in the first team; or determining the lead user based on a vote for each of the users in the first team.

4. The content providing method of claim 2, wherein the determining of whether the condition for the strategic timeout is satisfied during the progress of the content comprises: when a stored predetermined condition is satisfied during the progress of the content, outputting a button for the strategic timeout to the lead user; and when a request for the strategic timeout is received from the lead user through the button, determining that the condition is satisfied.

5. The content providing method of claim 4, wherein the stored predetermined condition comprises a condition in which a request for the strategic timeout is received from a preset proportion or greater of the users in the first team.

6. The content providing method of claim 4, wherein the stored predetermined condition comprises a condition in which a sum of remaining physical strengths of user characters of the users in the first team is less than a preset value.

7. The content providing method of claim 4, wherein the stored predetermined condition comprises a condition in which an accumulated value of scores obtained by user characters of the users in the first team is greater than or equal to a preset value.

8. The content providing method of claim 4, wherein the stored predetermined condition comprises a condition in which a degree of the progress of the content reaches a preset degree.

9. The content providing method of claim 2, wherein the providing of the at least one function for the strategic timeout to each of the users in the first team and the users in the second team comprises: providing at least one of a text chat function or a voice chat function.

10. The content providing method of claim 9, wherein at least one of the text chat function or the voice chat function is provided only to the lead user.

11. The content providing method of claim 10, wherein the providing of the at least one function for the strategic timeout to each of the users in the first team and the users in the second team further comprises: providing a function of combining preset words to users excluding the lead user among the users.

12. The content providing method of claim 1, wherein the providing of the at least one function for the strategic timeout to each of the users in the first team and the users in the second team comprises: determining a target event among one or more events occurring during the progress of the content; and providing a review image of the target event to the users in the first team.

13. The content providing method of claim 1, wherein the providing of the at least one function for the strategic timeout to each of the users in the first team and the users in the second team comprises: providing a user character maintenance function.

14. The content providing method of claim 1, wherein the providing of the at least one function for the strategic timeout to each of the users in the first team and the users in the second team comprises: displaying a target user character selected by a teaching user among the users in the first team; and displaying the target user character controlled based on an input from the teaching user.

15. The content providing method of claim 1, further comprising: when the condition for the strategic timeout is satisfied, determining whether a rejection condition for not providing the strategic timeout is satisfied, wherein the providing of the strategic timeout to the users comprises: when the rejection condition is not satisfied, providing the strategic timeout to the users.

16. The content providing method of claim 15, wherein the determining of whether the condition for the strategic timeout is satisfied during the progress of the content comprises: when a request for the strategic timeout is received from a lead user of the first team, determining that the condition for the strategic timeout is satisfied, wherein the determining of whether the rejection condition for not providing the strategic timeout is satisfied comprises: outputting, to a lead user of the second team, a notification that the request for the strategic timeout is received from the first team; receiving a rejection of the strategic timeout from the lead user of the second team; and when the rejection of the strategic timeout is received, determining that the rejection condition is satisfied.

17. A non-transitory computer-readable storage medium storing instructions that, when executed by a processor, cause the processor to perform the content providing method of claim 1.

18. A content providing method executed by one or more servers for transmitting collaborative digital content, over a communication network, to a plurality of users divided into at least two teams, the method comprising:
generating a virtual space to which the plurality of users wirelessly connect simultaneously;
transmitting a digital content to a plurality of user terminals used by a respective user of the plurality of users, over the communication network, wherein each of the users of a receptive user terminal is included in one of a first team data structure and a second team data structure stored in a computer memory;
monitoring a progress of the digital content being utilized and changed by each of the plurality of user terminals;
storing in the computer memory a progress of the digital content utilized by each of the plurality of user terminals;
determining whether a condition for a strategic timeout, from a plurality of stored conditions, is satisfied during a progress of the content;
storing a state of the progress of the digital content in the computer memory, when the progress of the digital content is suspended;
when the condition is satisfied, transmitting over the communication network, the strategic timeout to the user terminals for suspending the progress of the digital content by the user terminals;
transmitting over the communication network, at least one function for the strategic timeout to each of users in the first team and users in the second team, wherein the at least one function comprises a function of providing, to the users in the first team, a review image of a new viewpoint generated for a target event; and
resuming the progress of the digital content when the strategic timeout ends, by loading the stored state of the progress of the digital content.

19. A server for transmitting, over a computer network, collaborative digital content to a plurality of users divided into at least two teams, the server comprising:
a memory in which a program of providing the collaborative content is stored; and a processor configured to execute the program, wherein the program comprises:
generating a virtual space to which the plurality of users wirelessly connect simultaneously;
transmitting a digital content to a plurality of user terminals used by a respective user of the plurality of users, over a communication network, wherein each of the users of a receptive user terminal is included in one of a first team data structure and a second team data structure stored in the memory;
monitoring a progress of the digital content being utilized and changed by each of the plurality of user terminals;
storing in the memory a progress of the digital content utilized by each of the plurality of user terminals;
determining whether a condition for a strategic timeout, from a plurality of stored conditions, is satisfied during a progress of the content;
when the condition is satisfied, transmitting over the communication network, the strategic timeout to the user terminals for suspending the progress of the digital content by the user terminals;
storing a state of the progress of the digital content, when the progress of the digital content is suspended;
transmitting over the communication network, at least one function for the strategic timeout to each of users in the first team and each of the users in the second team; and
resuming the progress of the digital content when the strategic timeout ends, by loading the stored state of the progress of the digital content.

\* \* \* \* \*